(12) United States Patent
Keough et al.

(10) Patent No.: US 6,283,526 B1
(45) Date of Patent: Sep. 4, 2001

(54) PICKUP TRUCK STORAGE SYSTEM

(76) Inventors: Thomas A. Keough; Rhoda J. Keough, both of 5839 Kathryn Dr., Indianapolis, IN (US) 46228

(*) Notice: Subject to any disclaimer, the term of this patent is extended or adjusted under 35 U.S.C. 154(b) by 0 days.

(21) Appl. No.: 09/664,425

(22) Filed: Sep. 18, 2000

(51) Int. Cl.$^7$ .................................................. B62C 1/06
(52) U.S. Cl. ................ 296/26.09; 296/37.6; 296/26.13; 296/183
(58) Field of Search ................ 296/26.09, 37.6, 296/183, 26.13; 312/334.23, 334.26, 345

(56) References Cited

U.S. PATENT DOCUMENTS

| | | | |
|---|---|---|---|
| 844,447 | * | 2/1907 | Gautier ............................ 312/334.26 |
| 965,577 | * | 7/1910 | Gemmer .......................... 312/334.26 |
| 2,494,382 | * | 1/1950 | Faulkner et al. ................. 312/334.26 |
| 2,784,027 | * | 3/1957 | Temp ................................. 296/26.09 |
| 2,852,303 | * | 9/1958 | Hopson ............................ 296/26.09 |
| 3,784,274 | * | 1/1974 | Holmes et al. .................. 312/334.26 |
| 3,980,365 | * | 9/1976 | MacDonald et al. ................. 312/345 |
| 4,789,195 | * | 12/1988 | Fletcher ............................. 296/37.6 |
| 4,830,242 | * | 5/1989 | Painter .............................. 296/37.6 |
| 5,407,084 | * | 4/1995 | Remmers ......................... 312/334.23 |
| 5,649,731 | * | 7/1997 | Tognetti ............................ 296/26.09 |
| 5,820,190 | * | 10/1998 | Benner .............................. 296/26.09 |
| 5,848,818 | * | 12/1998 | Flueckinger ....................... 296/37.6 |
| 5,927,783 | * | 7/1999 | Baka ................................... 296/37.6 |
| 5,988,722 | * | 11/1999 | Parri ................................. 296/26.09 |
| 6,003,923 | * | 12/1999 | Scott et al. ......................... 296/37.6 |
| 6,033,002 | * | 3/2000 | Clare et al. ........................ 296/37.6 |
| 6,059,339 | * | 5/2000 | Madson ............................ 296/26.09 |
| 6,065,792 | * | 5/2000 | Sciullo et al. .................... 296/26.09 |
| 6,068,319 | * | 5/2000 | O'Brien ............................ 296/37.6 |
| 6,095,914 | * | 8/2000 | Cornelissen et al. ............... 452/179 |
| 6,142,549 | * | 11/2000 | Clare et al. ........................ 296/37.6 |

FOREIGN PATENT DOCUMENTS

0467565 * 6/1914 (FR) ................................ 312/334.26

* cited by examiner

*Primary Examiner*—Joseph D. Pape
*Assistant Examiner*—Kiran B. Patel
(74) *Attorney, Agent, or Firm*—Daniel J. O'Connor

(57) ABSTRACT

A system and method combined with a pickup truck bed. The bed is structurally divided into upper and lower layers to optimize the transport of tools and other materials. A lower slide-out drawer, which runs substantially the length of the pickup truck bed, is provided so that tools may be easily accessed. An upper layer may then be efficiently used for cargo or other materials.

1 Claim, 2 Drawing Sheets

PICKUP TRUCK STORAGE SYSTEM

BACKGROUND AND OBJECTS OF THE INVENTION

The present invention is generally related to the transportation and storage arts and, in particular, to a pickup truck bed having a slide-out drawer and shelf system for optimal transport and storage of tools and other materials.

Prior art systems have attempted to address this problem of maximizing pickup truck storage without significant commercial success.

Accordingly, it is an object of the present invention to set forth a novel pickup truck storage system which may be universally used with any pickup truck bed.

It is a further object of the invention to demonstrate a novel pickup truck storage system which may be economically manufactured for widespread commercial appeal.

It is also an object of the invention to show and describe a pickup truck storage system which may be easily installed and used and allows the transport of more tools and materials.

It is a still further object of the present invention to demonstrate a system wherein certain tools and other materials may be readily accessed without disturbing the other materials being transported.

These and other objects and advantages of the present invention will be apparent to those of skill in the art from the description which follows.

It is presently contemplated that the invention will be marketed under the the tradename and trademark "Journeyman's Helper".

PRIOR ART PATENTS AND DESIGNS

During the course of preparing this specification for submission to the U.S. Patent Office, a full search of the prior art was conducted.

U.S. Pat. No. 4,767,149 teaches the use of a pickup truck bed liner. The patent does not show the drawer or other related structure taught by the present invention.

U.S. Pat. No. 5,927,783 teaches the use of modular shelving for the bed of a pickup truck. The patent does not teach the drawer or other related designs of the present invention.

The present invention is thus believed to be clearly patentable over all known prior art systems, structures and methods.

SUMMARY OF THE INVENTION

In combination with a pickup truck bed, a system of transverse slats and elongated rails is provided.

The slats and rails provide upper support for a lower elongated drawer which is slidable to an outer position so that a lower tool or cargo area may be easily accessed without disturbing an upper cargo area of the pickup truck bed.

The drawer is moved via rollers which pass along the upper rails.

The drawer is suspended from roller assemblies by means of flexible rod elements extending downwardly from the roller assemblies.

An upper shelf rests on the slats to provide an upper cargo space which is not disturbed when the lower drawer is accessed by the user.

BRIEF DESCRIPTION OF THE DRAWING FIGURES

FULL DESCRIPTION OF A PREFERRED EMBODIMENT

Figure 1:
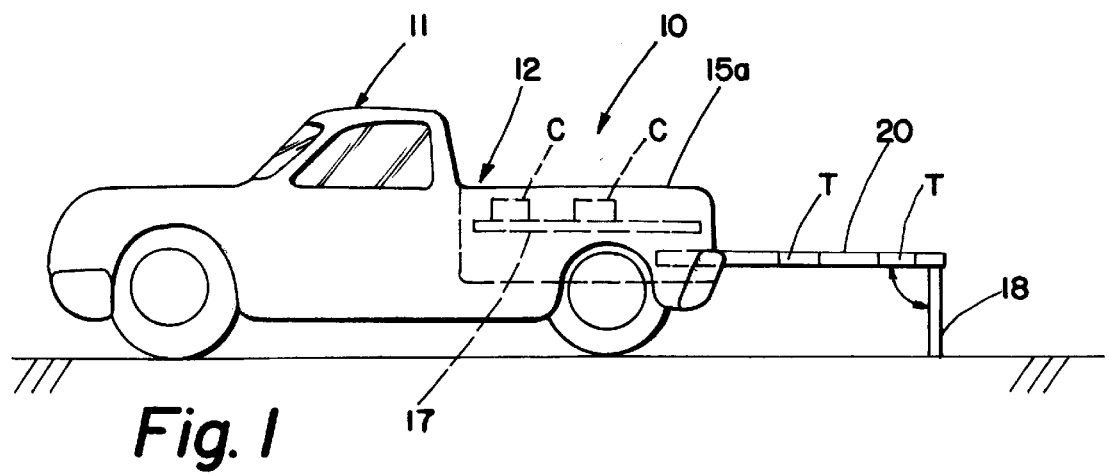
FIG. 1 is a side schematic view of a pickup truck and a lower drawer in an extended position. An upper shelf, to provide an upper cargo area, is indicated in FIG. 1.

Referring to the drawing figures, FIG. 1 is a side schematic view of a pickup truck 10 having a cab portion 11 and a rear cargo area 12.

The cargo area 12 has side panels 15a and 15b as is known in the art.

In accord with the invention, a shelf 17 is provided for cargo materials C.

A lower drawer 20 is also provided and is slidable to an outer position as indicated in FIG. 1. The drawer 20 can be used for tools T or other materials.

The drawer 20 includes a rotating support leg 18 so that the drawer may be supported in its extended position. The support leg is adjustable in length.

Importantly, FIG. 1 illustrates the overall advantages of the invention. Items such as cargo C and tools T may be efficiently packed and separated in the bed of the truck. Also, the lower items T may be easily accessed without disturbing the upper cargo C.

Figure 2:
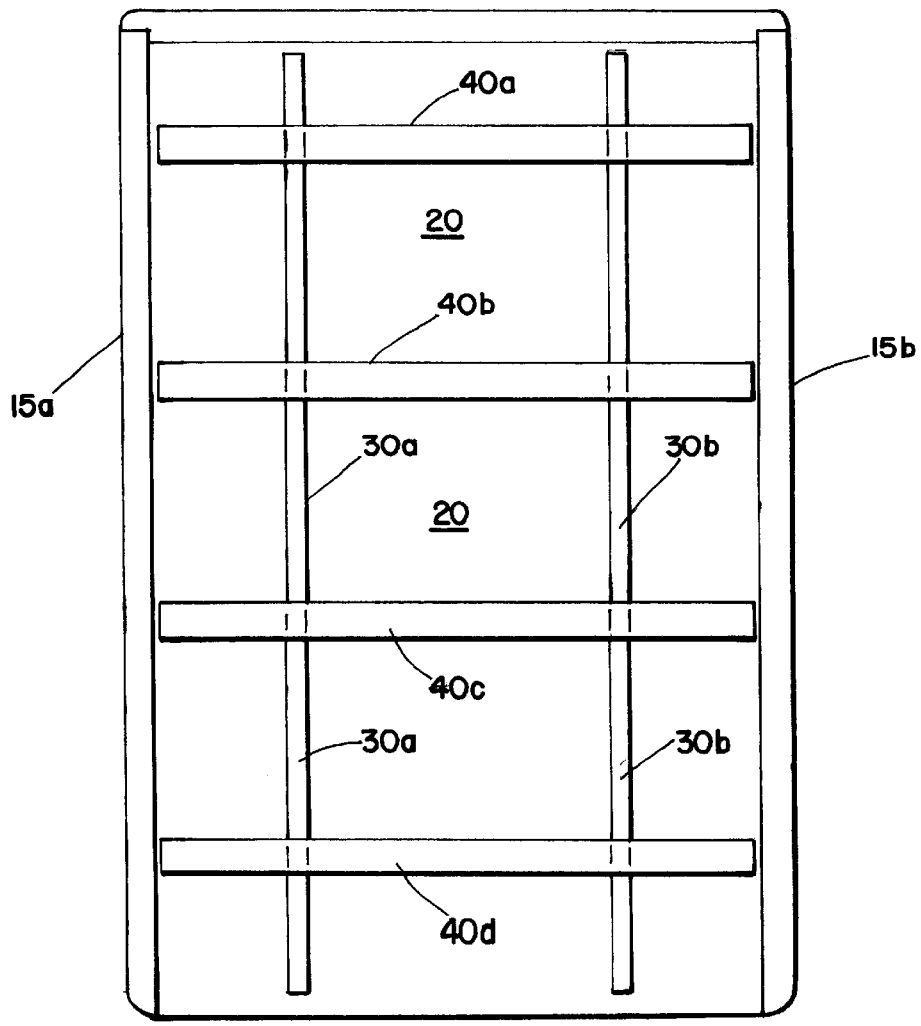
FIG. 2 is a top view of the pickup truck bed, with shelf removed, and illustrates the position of transverse slats and drawer-supporting rails in the system.

FIG. 2 is a top view of the pickup truck bed with shelf 17 removed. FIG. 2 illustrates a portion of the support system for the overall invention.

As shown, a plural slats 40a, 40b, 40c, 40d extend between the side panels 15a and 15b of the truck bed. The slats provide support for an upper cargo shelf.

As further shown in FIG. 2, two rails 30a and 30b are provided and run substantially the length of the pickup truck bed.

As will be further shown, the lower drawer 20 is supported via the rails 30a and 30b.

The slideout drawer 20 moves along the rails 30a and 30b by means of rollers and roller assemblies to be further described.

As will be appreciated, the slats 40a, 40b, 40c and 40d and the rails 30a and 39b are to be fabricated of metals or high-strength materials capable of supporting high-weight cargo loads and the lower slideout drawer.

Figure 3:
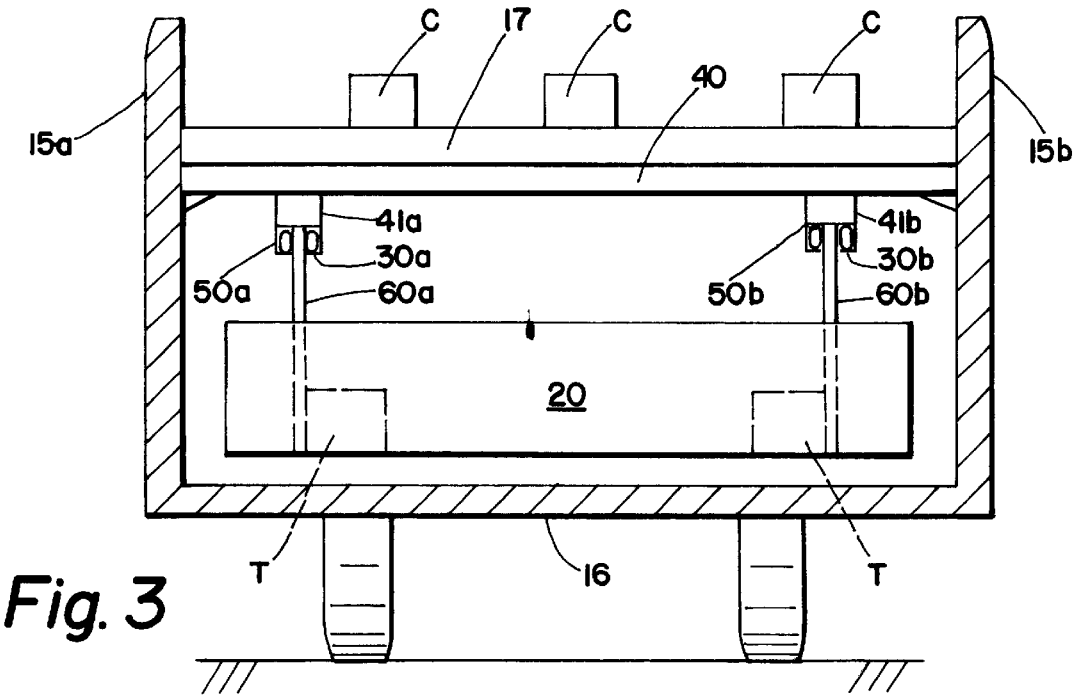
FIG. 3 is a rear view of the pickup truck bed and shows the lower drawer in relation to roller assemblies which pass over the supporting rails.

FIG. 3 is a rear view of the pickup truck bed with the invention components incorporated therein.

As shown, the slat elements 40 extend between the side panels 15a and 15b.

The rails 30a and 30b are retained to the slats by a pair of depending support arms 41a and 41b.

A pair of roller assemblies 50a and 50b, to be further described, ride along rails 30a and 30b.

A pair hanging flexible rods 60a and 60b extend downwardly from the roller assemblies 50a and 50b and are attached to the lower drawer 20.

Thus, the lower drawer 20 may be slid out over the lower truck bed 16 when desired.

In this manner, the lower tools T within drawer 20 may be easily accessed without disturbing the upper cargo material elements C.

Stop elements (not shown) may be included in the system so that the drawer 20 cannot be accidentally pulled entirely out of the pickup truck bed.

Figure 4:
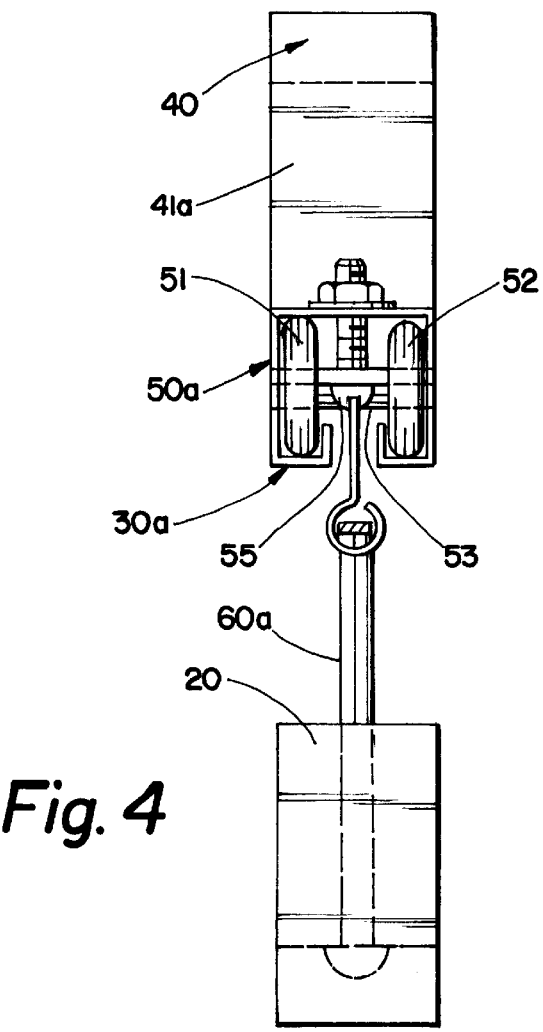
FIG. 4 is an enlarged view of the roller assemblies in relation to the supporting rails and the lower slide-out drawer.

FIG. 4 is an enlarged view of the roller assembly 50*a* which rides on the rail 30*a* of FIG. 3.

As shown in FIG. 4, the roller assembly 50*a* includes a pair of rollers 51 and 52 which are connected by an axle 53.

The roller assembly 50*a* further includes a downwardly extending attaching member 55 for connection to the hanging flexible rod 60*a*.

As previously described, the hanging flexible rod 60*a* is securely attached to the lower drawer 20.

The other roller assembly 50*b* (FIG. 3) is of substantially the same construction as roller assembly 50*a*.

While a particular structure and method of operation has been shown and described, it is intended in this specification to cover all equivalent structures and operating methods which would reasonably occur to those of skill in the art.

The invention is further defined by the claims appended hereto.

We claim:

1. In combination with a pickup truck bed (12) having side panels (15*a*, 15*b*) and a lower bed floor (16), a cargo (C) and tool (T) storage and transport system comprising:

a lower storage drawer (20), said drawer extending substantially the length of said pickup truck bed and being near the bed floor, said drawer being supported by a pair of rails (30*a*, 30*b*), said rails being supported by plural slats (40*a,b,c,d*) which extend between said side panels (15*a*, 15*b*), wherein said cargo elements(C) are supported at an upper level of said truck bed and wherein tool elements (T) are contained within said lower drawer to enable said tools to be accessed without disturbing the upper cargo, the combined pickup truck bed system further including a shelf (17) positioned over said slats for support of said cargo (C), the pickup truck system further including at least two roller assemblies (50*a*, 50*b*) positioned beneath said slats (40*a*, 40*b*, 40*c*, 40*d*), said roller assemblies riding on said rails (30*a*, 30*b*), said roller assemblies providing means whereby said drawer (20) may be pulled to an extended position, wherein said drawer (20) includes a rotatable support leg (18) at one end thereof to permit support of said drawer in an extended position, wherein said roller assemblies include two rollers (51, 52) and means(55) for supporting a lower flexible rod (60*a*) which is attached to said lower drawer (20), wherein said roller assemblies (50*a*, 50*b*) and flexible rods (60*a*, 60*b*) which support the lower drawer (20) result in optimal transport and storage of tools (T) in said drawer and wherein said drawer may move laterally during transport to reduce strain on said roller assemblies.

* * * * *